US 8,336,297 B2

(12) United States Patent
Morita et al.

(10) Patent No.: US 8,336,297 B2
(45) Date of Patent: Dec. 25, 2012

(54) VEHICLE WITH SECONDARY AIR SUPPLY PASSAGE

(75) Inventors: Kyouji Morita, Iwata (JP); Nobuyuki Miyoshi, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 815 days.

(21) Appl. No.: 12/382,153

(22) Filed: Mar. 10, 2009

(65) Prior Publication Data

US 2009/0266327 A1    Oct. 29, 2009

(30) Foreign Application Priority Data

Mar. 11, 2008    (JP) .................................. 2008-061352

(51) Int. Cl.
*F01N 3/00*    (2006.01)
*F01N 3/02*    (2006.01)
(52) U.S. Cl. ........................................... 60/289; 60/317
(58) Field of Classification Search ............. 60/289.614, 60/289, 614, 293, 317
See application file for complete search history.

(56) References Cited

U.S. PATENT DOCUMENTS

| 6,126,119 | A  | * | 10/2000 | Giangrasso ..................... 248/58 |
| 2001/0018022 | A1 | * | 8/2001 | Nakamura ..................... 415/203 |
| 2007/0044747 | A1 | * | 3/2007 | Sawatari et al. ......... 123/184.21 |
| 2007/0089921 | A1 | * | 4/2007 | Miyabe ......................... 180/219 |
| 2007/0240404 | A1 | * | 10/2007 | Pekrul et al. ..................... 60/282 |
| 2008/0190079 | A1 | * | 8/2008 | Cerdes ............................. 55/319 |

FOREIGN PATENT DOCUMENTS

JP    07251628 A    * 10/1995
JP    2007-040250    2/2007

OTHER PUBLICATIONS

Nakayama et al., English Abstract of JP 07-251628 A, Oct. 3, 1995.*

* cited by examiner

*Primary Examiner* — Kenneth Bomberg
*Assistant Examiner* — Audrey K Bradley
(74) *Attorney, Agent, or Firm* — Rabin & Berdo, P.C.

(57) ABSTRACT

A vehicle can include an engine, an air cleaner for supplying air taken in by the engine, an exhaust passage for exhausting exhaust gas of the engine, and a secondary air passage for connecting the air cleaner to the exhaust passage and for supplying secondary air to the exhaust passage. A one-way valve can be disposed in the secondary air passage. A resonator portion can be interposed between the air cleaner and the one-way valve. The resonator portion can branch from the secondary air passage and can include a closed space. A water drain portion can be disposed in the closed space of the resonator portion.

20 Claims, 9 Drawing Sheets

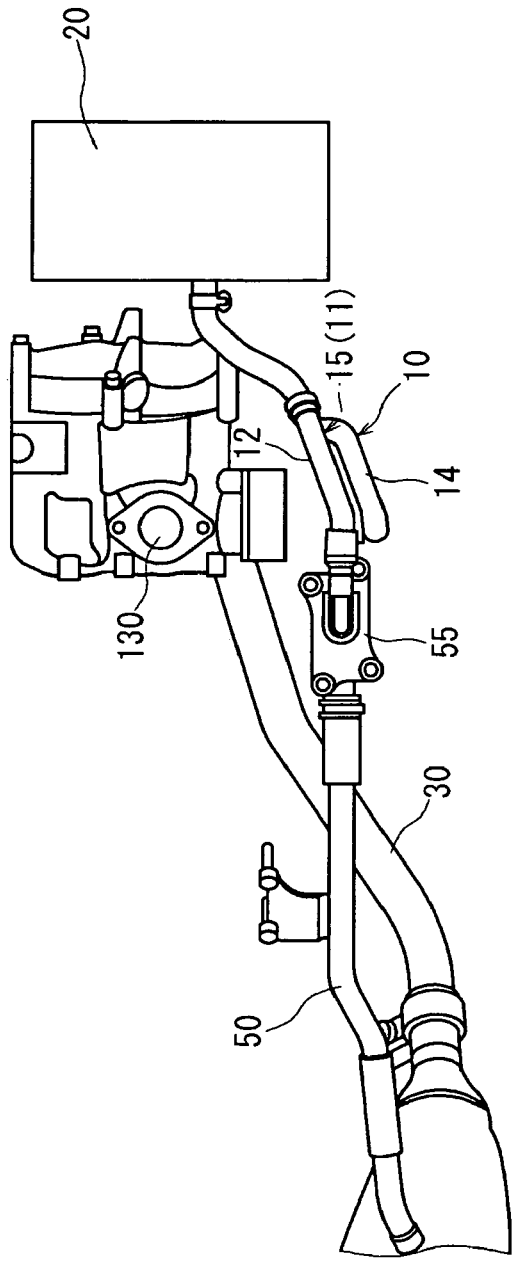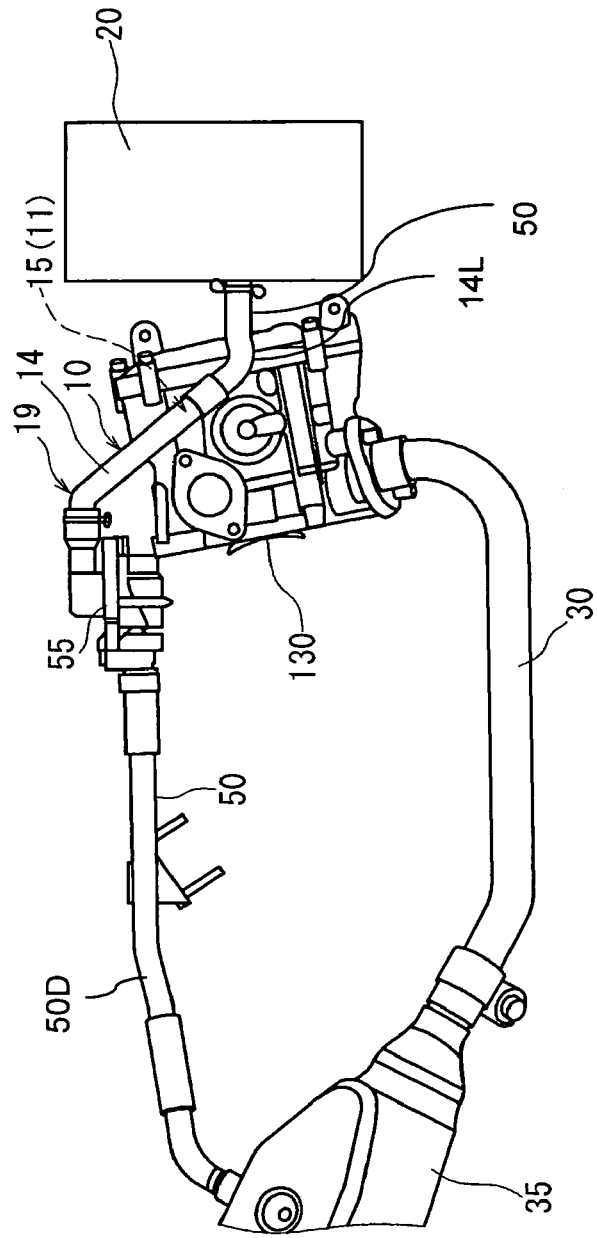
Fig. 4(a)
Fig. 4(b)

VEHICLE WITH SECONDARY AIR SUPPLY PASSAGE

CROSS-REFERENCE TO RELATED APPLICATION

This application claims priority under 35 U.S.C. §119 from Japanese Patent Application 2008-061352, filed Mar. 11, 2008, the entirety of which is incorporated herein by reference.

BACKGROUND OF THE INVENTION

1. Technical Field

Embodiments of the present invention relate to a vehicle, and in particular to a vehicle provided with a secondary air supply passage for supplying air to an exhaust passage of an internal combustion engine.

2. Background Art

In an internal combustion engine for a straddle-type vehicle such as a motorcycle, a secondary air supply passage for supplying air to an exhaust passage may be arranged as an exhaust emission control device. Such an arrangement is described, for example, in Japanese Unexamined Patent Publication No. 2007-40250. In the described arrangement, a one-way reed valve is disposed in the secondary air supply passage. The reed valve functions in the following manner: when pressure in the exhaust passage is made negative by an exhaust pulsating pressure produced in the exhaust passage, the reed valve opens to vent or pass air; on the other hand, when the pressure in the exhaust passage is made positive, the reed valve closes to stop venting or passing the air. In other words, the reed valve is a device that opens or closes, according to the pulsation of exhaust gas, to send air (secondary air) to the exhaust passage for cleaning the exhaust gas.

SUMMARY OF THE INVENTION

Embodiments of the present invention relate to structures in a secondary air passage of a vehicle. The secondary air passage can supply air to an exhaust passage.

In embodiments, a vehicle according to the invention can include an engine, an air cleaner for supplying air taken in by the engine, an exhaust passage for exhausting exhaust gas of the engine, and a secondary air passage for connecting the air cleaner to the exhaust passage and for supplying secondary air to the exhaust passage. A one-way valve can be disposed in the secondary air passage. For example, the one-way valve can be disposed in substantially a middle of the secondary air passage. A resonator portion can be interposed between the air cleaner and the one-way valve. The resonator portion can branch from the secondary air passage and can include a closed space. A water drain portion can be disposed in the closed space of the resonator portion.

The vehicle can be a straddle-type vehicle, such as a motorcycle, for example.

According to the above-described embodiments, condensed atmospheric moisture that collects as water in the secondary air supply passage, and that can potentially degrade a catalyst of the exhaust system, can be effectively discharged. More specifically, the moisture can collect as water in the closed space of the resonator portion and be discharged. As a result, the degradation of the catalyst can be prevented.

BRIEF DESCRIPTION OF THE DRAWINGS

FIG. 4(a) is a top plan view of parts of the motorcycle, including an engine, an exhaust passage, and a secondary air passage;

FIG. 4(b) is a side view the aforementioned parts;

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

A straddle-type vehicle (in particular, a motorcycle) 1000 according to embodiments of the present invention will be described with reference to FIG. 1 to FIG. 5.

Figure 1:
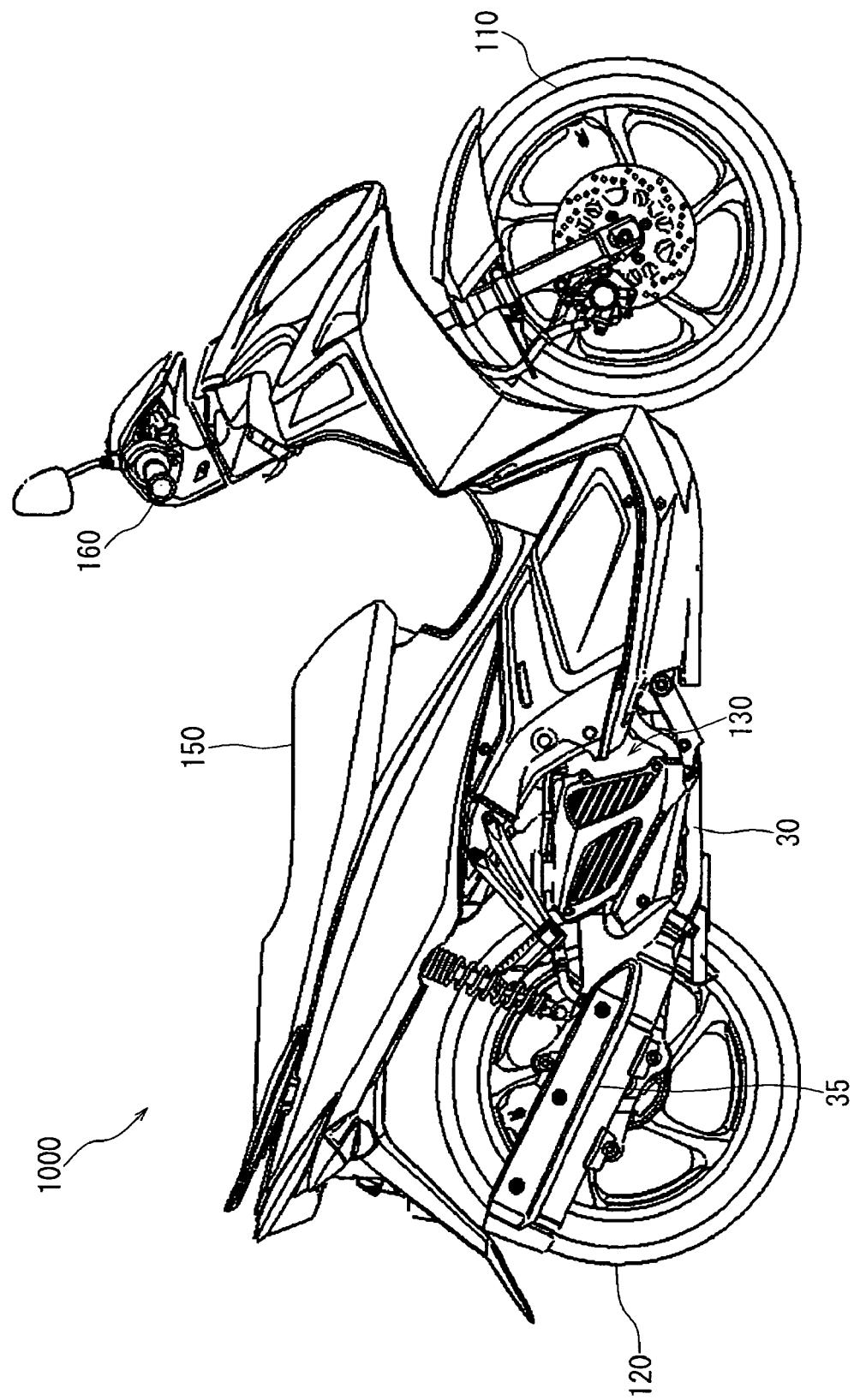
FIG. 1 is a side view of a motorcycle according to embodiments of the present invention.

FIG. 1 is a side view of the motorcycle 1000 according to the embodiments. As shown in FIG. 1, the motorcycle 1000 can include a front wheel 110, a rear wheel 120, and a driving source (e.g., engine) 130 interposed between the front wheel 110 and the rear wheel 120.

The front wheel 110 can be turned by a handlebar 160. The rear wheel 120 can be a driving wheel and be driven by the power of the engine 130. Moreover, the engine 130 can be connected to a silencer 35 via an exhaust passage. The silencer 35 can include a catalyst housed therein. The quantities of HC, NOx, and CO in exhaust gas can be reduced by the action of the catalyst.

Moreover, a seat 150 on which a rider can be seated can be disposed rearward of the handlebar 160. The rear wheel (e.g., driving wheel) 120 can be positioned downward (or obliquely rearward and downward) of the seat 150.

Figure 2:
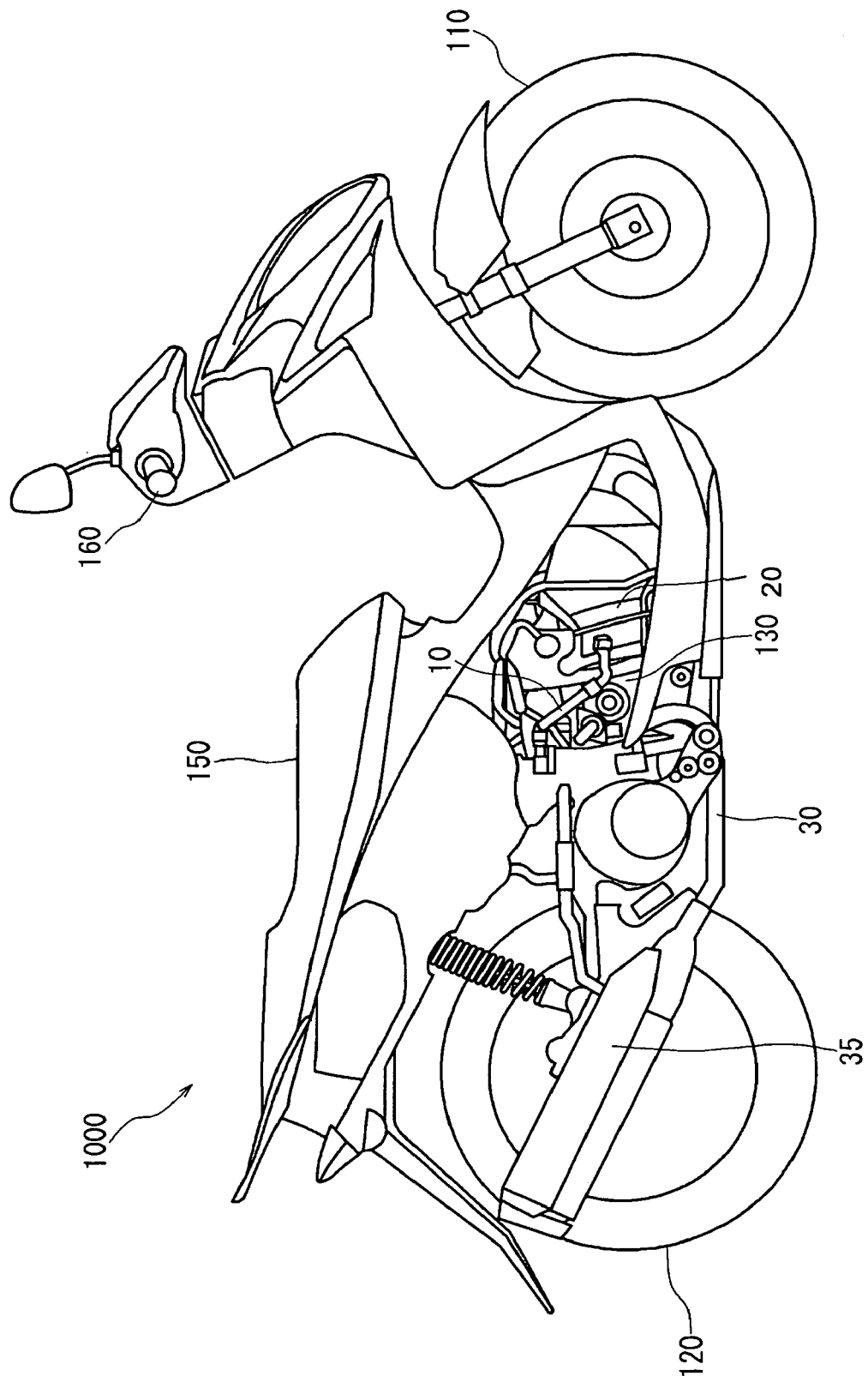
FIG. 2 is a side view of the motorcycle, including a cutaway view of parts of the motorcycle.
Figure 3:
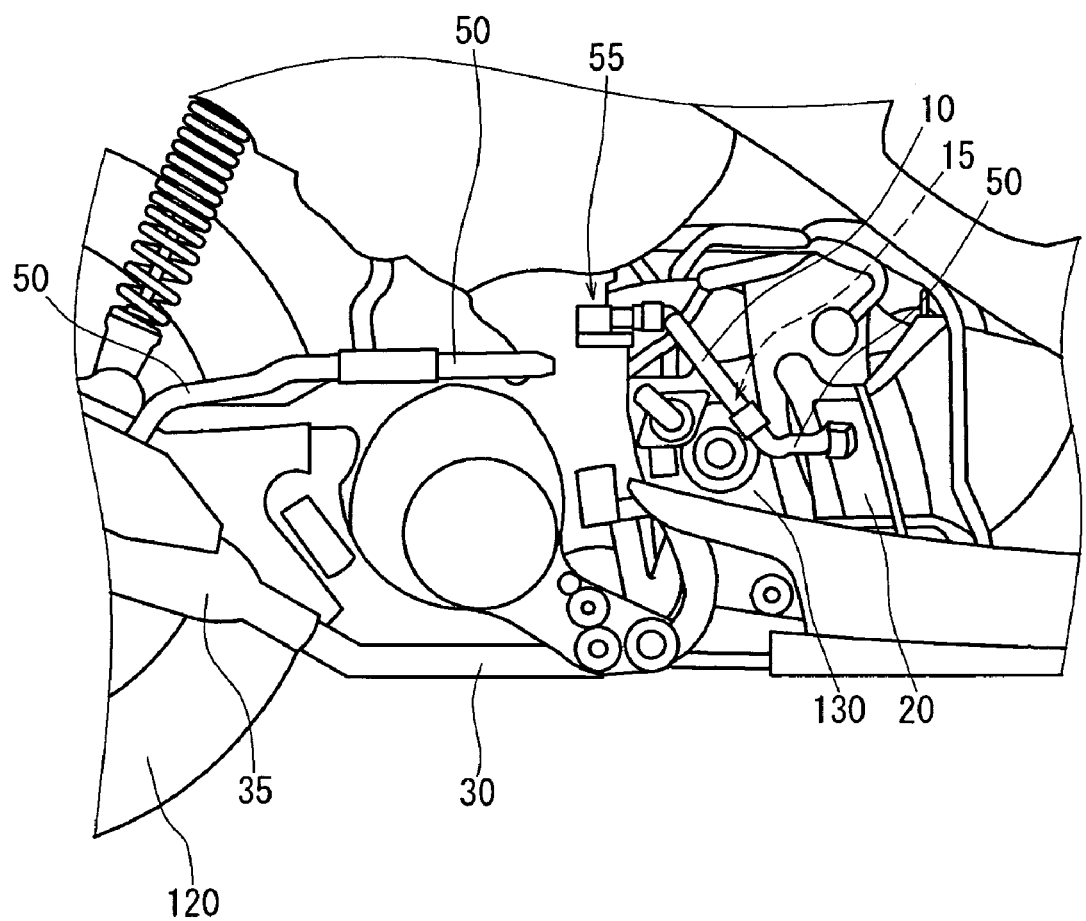
FIG. 3 is a partial enlarged side view of the motorcycle including the cutaway view.
Figure 5:
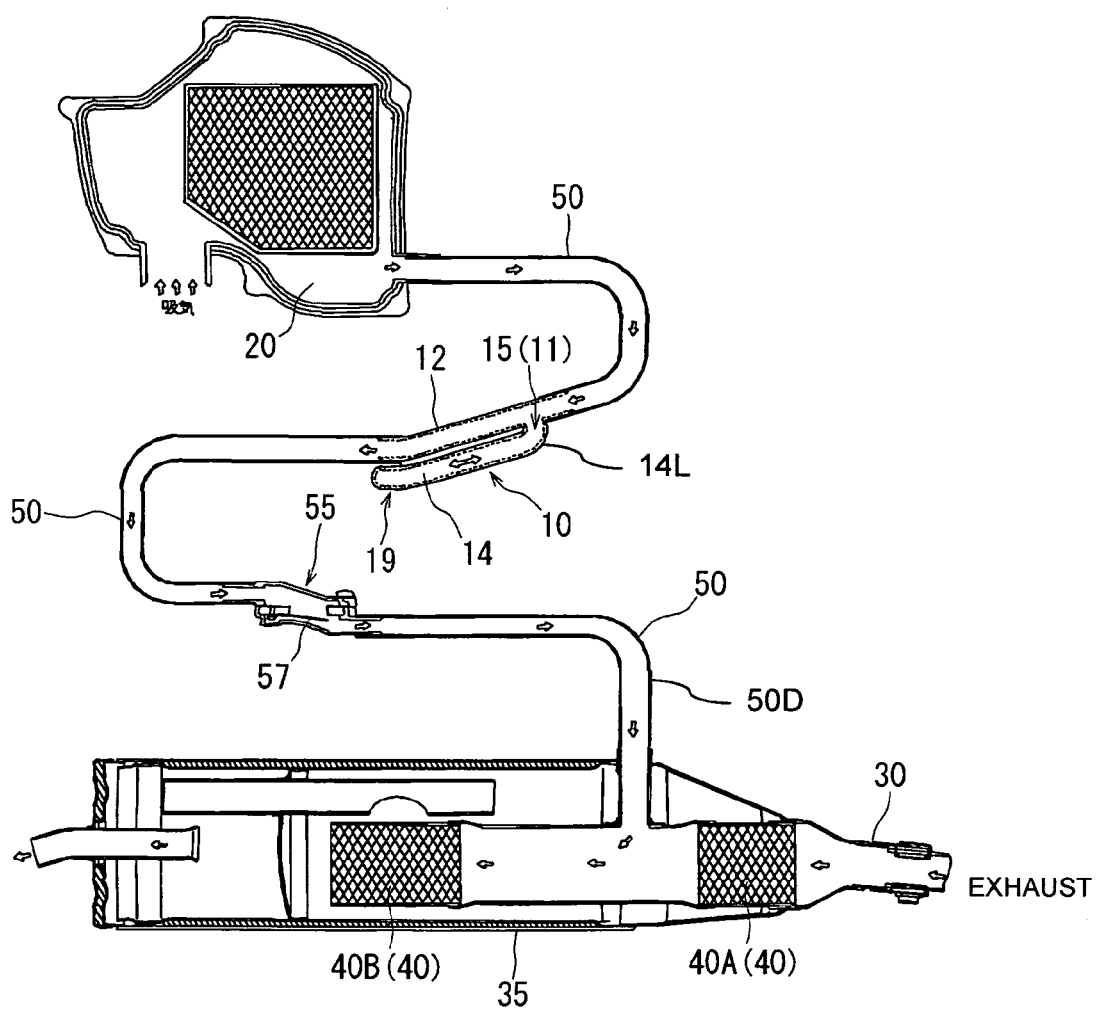
FIG. 5 shows a route of the exhaust passage and the secondary air passage.

FIG. 2 is a side view of the motorcycle 1000 with parts around the engine 130 exposed in a cutaway view. FIG. 3 is an enlarged view of the parts around the engine 130. FIG. 4(a) is a top view to show one illustrative example of a construction of the engine 130, an exhaust passage 30, and a secondary air passage 50, and FIG. 4(b) is a side view of the example. FIG. 5 shows a route of the exhaust passage 30 and the secondary air passage 50.

Referring to FIGS. 3-5, the motorcycle 1000 can include: the engine 130; an air cleaner 20 for supplying air for intake by the engine 130; the exhaust passage 30 for exhausting the exhaust gas of the engine 130; and the secondary air passage 50 for connecting the air cleaner 20 with the exhaust passage 30.

The secondary air passage 50 can act as a passage for supplying secondary air to the exhaust passage 30. The secondary air passage 50 can include a one-way valve 55 disposed in the secondary air passage 50. The one-way valve 55 can be disposed, for example, in substantially or approximately a middle of the secondary air passage 50, and can supply secondary air to the exhaust passage 30.

Referring to FIG. 5, the one-way valve 55 can include a reed valve 57. The reed valve 57 can move or displace a reed to open or close an opening, according to the pulsation of exhaust gas produced in the exhaust passage 30, to send secondary air (air for cleaning exhaust gas) to the exhaust passage 30. In more detail, when the pressure of the exhaust passage 30 is negative, the one-way valve 55 including the reed valve 57 can open, allowing air to flow through to the exhaust passage 30. On the other hand, when the pressure in the exhaust passage 30 is positive, the one-way valve 55 can close, to stop the air from flowing through to the exhaust passage 30.

Referring to FIG. 5, a resonator portion 10 branching from the secondary air passage 50 and including a closed space 14 (also referred to further on as a "side pipe 14") can be interposed between the air cleaner 20 and the one-way valve 55. The closed space 14 of the resonator portion 10 can include a water drain portion 11 disposed therein. In more detail, the water drain portion 11 of the resonator portion 10 can be constructed from a connection portion 15 for connecting the closed space 14 of the resonator 10 to the secondary air passage 50. The connection portion 15 can return water produced in the closed space 14 of the resonator portion 10 to the secondary air passage 50.

It is to be appreciated that conventionally, an air filter for engine suction and an air filter for secondary air are disposed separately. By contrast, in embodiments of the present invention, an air filter for engine suction can also be used as an air filter for secondary air. This arrangement can decrease cost and increase flexibility in layout.

As shown in FIG. 4(b), a lowest portion 14L of the closed space 14 of the resonator 10 can be connected via the connection portion 15 to the secondary air passage 50. Thus, water produced in the closed space 14 can be returned to the secondary air passage 50 by gravity. The water returned to the secondary air passage 50 can flow to the air cleaner 20, and be sprayed and evaporated.

As further shown in FIG. 4(b), a portion of the connection portion 15 extending from the air cleaner 20 to the one-way valve 55 of the secondary air passage 50 can be constructed so as to form an up gradient. This construction can facilitate water drainage. Moreover, as further shown in FIG. 4(b) and FIG. 5, a portion 50D of the secondary air passage 50 extending from the one-way valve 55 to the exhaust passage 30 can be constructed so as to form a down gradient. In addition, the one-way valve 55 can be arranged at a highest position in the secondary air passage 50. The described arrangement can facilitate water drainage when the engine is not being operated, since the one-way valve 55 is closed when the engine is not operated.

Referring to FIG. 5, the silencer 35 can include a catalyst 40 (40A, 40B), and can be positioned on a downstream side of the secondary air passage 50. As noted previously, atmospheric moisture can collect as water in the secondary air passage 50, possibly resulting in degradation of the catalyst. However, structures according to embodiments of the invention as described above, including for example the water drain portion 11, can operate to discharge water collected in the closed space 14 of the resonator 10, preventing or lessening degradation of the catalyst by collected water.

Figure 6:
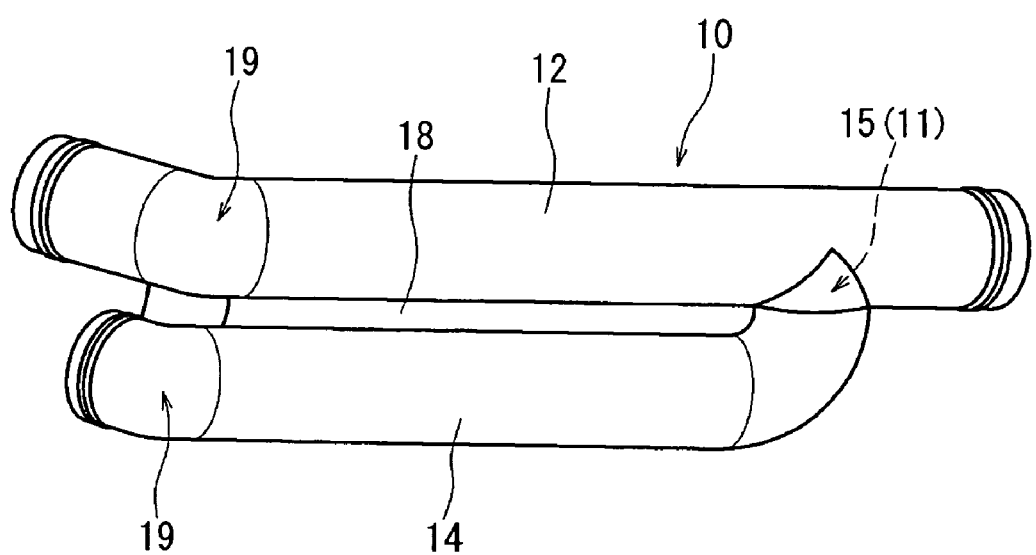
FIG. 6 shows details of a resonator portion of the motorcycle.

FIG. 6 shows further details of the resonator portion 10, which may also be referred to as a "side branch resonator," and/or as a "pipe-shaped member." The resonator portion 10 can, for example, be formed of resin by blow forming. The resonator portion 10 can include or be made of, for example, polypropylene. The blow forming can include the following acts: melted resin can be pushed out in the shape of a cylinder from a push-out opening of a die (the resin melted and shaped like a cylinder is also referred to as "parison" in some cases); the melted cylindrical resin can be sandwiched by sandwiching dies at upper and lower portions thereof, thereby being formed into the shape of a bag; a needle-shaped blowing nozzle can be inserted into the bag-shaped resin; and then air can be blown (e.g., in a burst) into the bag-shaped resin, to form an intermediate product comprising a bulged, bag-shaped resin. The bulged, bag-shaped resin can be pressed onto inner faces of the sandwiching dies, and be solidified along the shapes of the inner faces of the sandwiching dies. The sandwiching dies can then be opened and the solidified resin can be taken out. When the sandwiching dies are opened and the solidified resin is taken out, a portion known as a "burr," extruded when the resin is sandwiched by the dies, remains. The burr can be removed, e.g., chipped off, to form a final product.

An alternative method called "three-dimensional" blow forming can avoid the need to remove a burr. A method using three-dimensional blow forming can include the following acts: a parison is placed inside a die with a push-out opening; and then blow forming is performed. According to this method, a burr is not produced and a complex shape such as a letter L, a letter J, or a letter S can be formed.

Referring to FIG. 6, the resonator portion 10 can include a main passage 12 connected to the secondary passage 50, and a side pipe 14 (also referred to hereinabove as "closed space 14") branching from the main passage 12. The side pipe 14 can include the closed space described above, and can further perform a function of reducing sound. In more detail, the resonator portion 10 can reduce pulsation sound from the air cleaner 20 when the pulsation sound is large.

Figure 7:
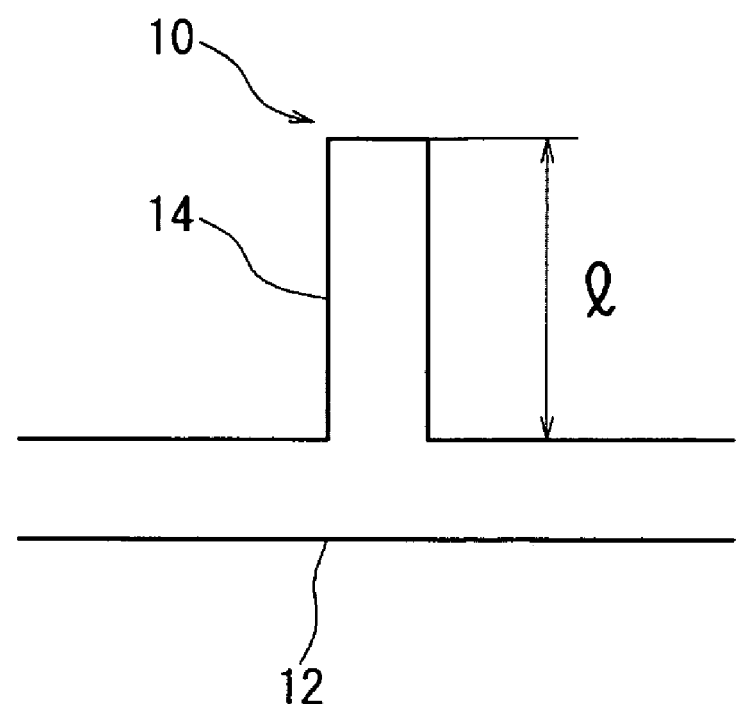
FIG. 7 is a diagram showing the resonator portion schematically.

To further explain, the resonator portion 10 can be schematically represented as shown in FIG. 7. Here, when it is assumed that the length of the side pipe 14 is a side branch length l, a resonance frequency f can be expressed by the following equation 1:

$$f=(2n-1)/4 \times c/l \text{ (Hz)} \qquad \text{(equation 1)}$$

where
  c=the speed of sound
  l=side branch length (e.g., including compensation for pipe end)
  n=1, 2, 3, . . . .

Returning to FIG. 6, the main passage 12 and the side pipe 14 can be connected to each other by a rib 18, which can increase the strength of the side pipe 14. Accordingly, the side pipe 14 can be formed (e.g., integrally formed) so as to extend substantially along (e.g., substantially parallel to) the main passage 12. This arrangement uses space more effectively than conventional arrangements, which, by contrast, typically include a side branch resonator structure with piping formed substantially in a "T" shape.

The rib 18 can be formed along substantially an entire length, in a longitudinal direction, e.g., of the side pipe 14. Moreover, the side pipe 14 can be connected only to the main passage 12, which can eliminate the need for providing a fixing screw or a clamp for the side pipe 14. In addition, for example by the use of blow forming, a bent portion 19 can be also formed in the main passage 12 and the side pipe 14. The bent portion 19 can be used for improving the degree of flexibility in the layout and for improving the effective use of space.

As described above, and as shown in FIG. 5 and FIG. 6 in particular, for example, the connection portion 15 for connecting the main passage 12 of the resonator 10 and the side pipe 14 can form or include the water drain portion 11. However, alternative structures can be also employed for the water drain portion 11. For example, if the connection portion 15 is not at the lowest portion 14L of the closed space 14 of the resonator portion 10, a port for removing water can be disposed at a lowest portion of the resonator portion 10 and can provide a same or similar function as the water drain portion 11.

Figure 8A:
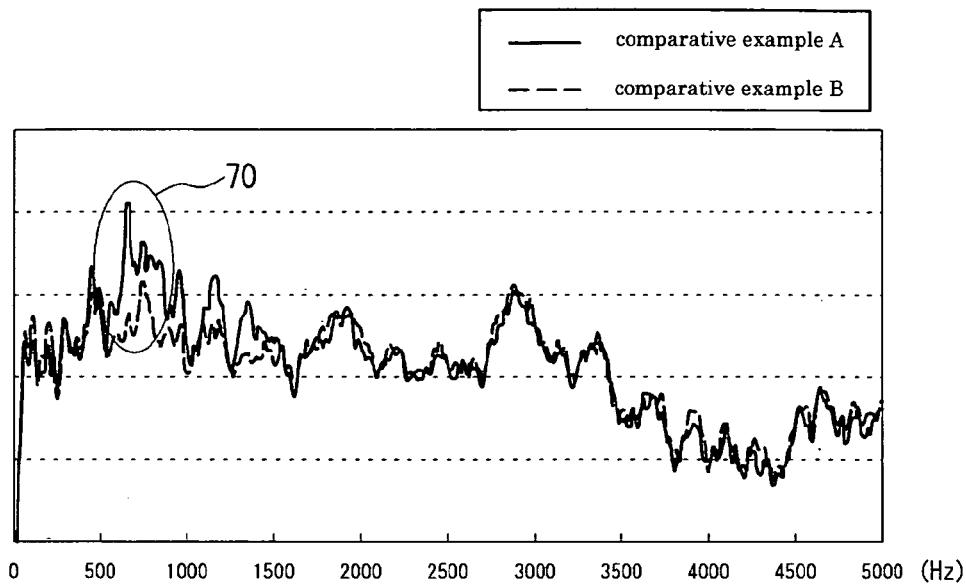
FIGS. 8(a) and (b) are graphs showing effects of the resonator portion.
Figure 8B:
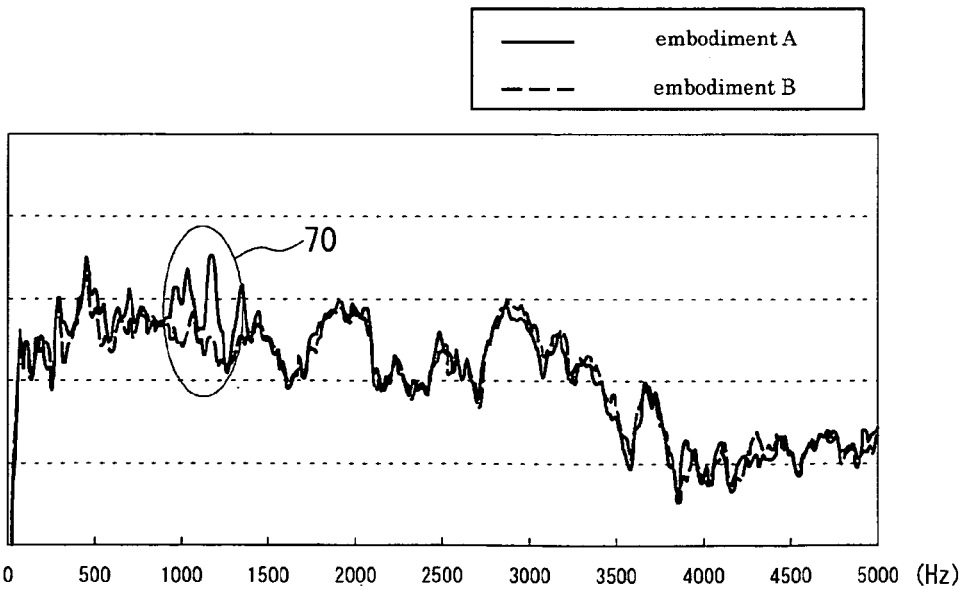

FIGS. 8(a) and 8(b) are graphs of sound value (ordinate) versus frequency in Hz (abscissa) to show an effect of the resonator portion 10 (side branch resonator structure).

FIG. 8(a) shows comparative examples A, B of results for an ON and OFF operation, respectively, of introducing the secondary air (i.e., the solid line representing "comparative example A" corresponds to a secondary air ON operation, and the dashed line representing "comparative example B" corresponds to a secondary air OFF operation), in a structure (e.g. a straddle-type vehicle such as a motorcycle) that does not include a resonator portion 10 as described above. By contrast, FIG. 8(b) shows an experimental example for a structure (e.g. a motorcycle 1000) including a resonator portion 10 as described above, where the side pipe length of the resonator portion 10 is 100 mm. The solid line representing "embodiment A" corresponds to a secondary air ON operation, and the dashed line representing "embodiment B" corresponds to a secondary air OFF operation. The examples illustrate how, even if the pipe diameter and external dimensions of the side branch in a resonator portion 10 according to embodiments of the present invention are limited, a sound value characteristic can be changed simply by the selection of the side pipe length.

Specifically, on the solid line representing the comparative example A shown in FIG. 8(a), a region 70 shows a peak or resonance point where the sound characteristic is poor. By contrast, on the solid line representing the embodiment A in FIG. 8(b), a region 70 shows a peak or resonance point shifted along the abscissa compared to the region 70 in FIG. 8(a). This shift represents an improvement in the sound characteristic which can be achieved with the resonator portion 10.

Figure 9:
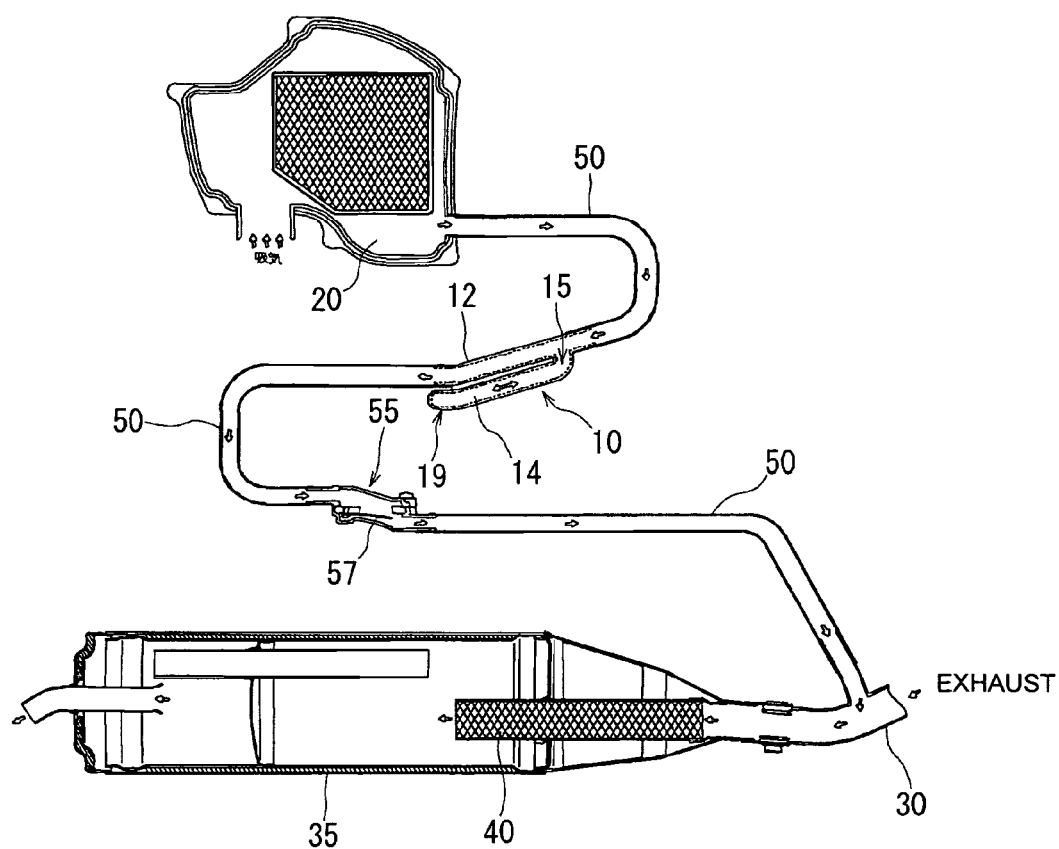
FIG. 9 shows an alternative route of the exhaust passage and the secondary air passage.

It is to be appreciated that various alternative or additional structures to those described above are possible in embodiments of the invention. For example, FIG. 5 shows a structure in which two catalysts 40A, 40B are used. However, in alternative embodiments, a single catalyst 40 can be used as shown in FIG. 9.

Further, FIG. 1 shows an example of a motorcycle of a "scooter" or "under-bone" type. However, embodiments of the invention can be implemented in other types of motorcycles or vehicles. For example, the embodiments can be implemented in a motorized bicycle or "motorbike," or in a scooter (e.g. a motorized scooter). The embodiments can be implemented, for example, in any kind of vehicle that can turn with the vehicle body inclined, including vehicles with three or more wheels, or vehicles with fewer wheels. Thus, for example, embodiments of the invention can be implemented in a four-wheeled buggy (ATV: All Terrain Vehicle) or a snowmobile.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A vehicle comprising:
   an engine;
   an air cleaner that supplies air for intake by the engine;
   an exhaust passage for exhausting exhaust gas from the engine; and
   a secondary air passage connecting with the air cleaner and the exhaust passage and for supplying secondary air from the air cleaner to the exhaust passage;
   wherein:
   a one-way valve is disposed in the secondary air passage;
   a resonator portion, which branches from the secondary air passage and includes a closed space, is interposed between the air cleaner and the one-way valve;
   a water drain portion is disposed in the closed space of the resonator portion; and
   the closed space of the resonator portion connects with the secondary air passage through the water drain portion, and the water drain portion is configured to drain water collected in the closed space of the resonator portion to the air cleaner via the secondary air passage.

2. The vehicle of claim 1, wherein a portion extending from the air cleaner to the one-way valve of the secondary air passage includes an up gradient.

3. The vehicle of claim 1, wherein a portion extending from the one-way valve to the exhaust passage of the secondary air passage includes a down gradient.

4. The vehicle of claim 1, wherein the one-way valve is arranged at a highest portion of the secondary air passage.

5. The vehicle of claim 1, wherein the one-way valve is disposed in substantially a middle of the secondary air passage.

6. The vehicle of claim 1, wherein the vehicle is a straddle-type vehicle.

7. The vehicle of claim 1, wherein the water drain portion is a connection portion through which the closed space of the resonator portion connects with the secondary air passage.

8. The vehicle of claim 7, wherein a lowest portion of the closed space of the resonator portion connects with the secondary air passage.

9. The vehicle of claim 1, wherein the resonator portion includes a pipe-shaped member.

10. The vehicle of claim 9, wherein the resonator portion is formed at least partly of resin.

11. The vehicle of claim 10, wherein the resonator portion is formed at least partly by blow forming.

12. The vehicle of claim 1, wherein the resonator portion includes:

a main passage connected to the secondary air passage; and
a side pipe branching from the main passage and including the closed space.

13. The vehicle of claim 12, wherein the side pipe is connected only to the main passage.

14. The vehicle of claim 12, wherein the main passage and the side pipe are connected to each other by a rib.

15. The vehicle of claim 14, wherein the rib is formed along substantially an entire length in a longitudinal direction of the side pipe.

16. A secondary air supply system for a vehicle, comprising:
   a secondary air passage configured to connect with an air cleaner and an exhaust passage, the air cleaner supplying air for intake by an engine;
   a resonator portion including a closed space; and
   a water drain portion configured to connect the resonator portion to the secondary air passage;
   wherein the closed space of the resonator portion connects with the secondary air passage through the water drain portion, and the water drain portion is configured to drain water collected in the closed space of the resonator portion to the air cleaner via the secondary air passage.

17. The secondary air supply system of claim 16, wherein the resonator portion includes a main passage and a side pipe arranged substantially parallel to the main passage.

18. The secondary air supply system of claim 17, wherein the side pipe includes the closed space.

19. The secondary air supply system of claim 16, wherein, when in place on the vehicle, the resonator portion is arranged on a gradient.

20. The secondary air supply system of claim 19, wherein, when in place on the vehicle, a lower part of the resonator portion is connected to the water drain portion.

* * * * *